June 6, 1961 A. F. HUNDERTMARK 2,986,927
APPARATUS FOR APPLYING INTERNAL PRESSURE
Filed May 6, 1958 2 Sheets-Sheet 1
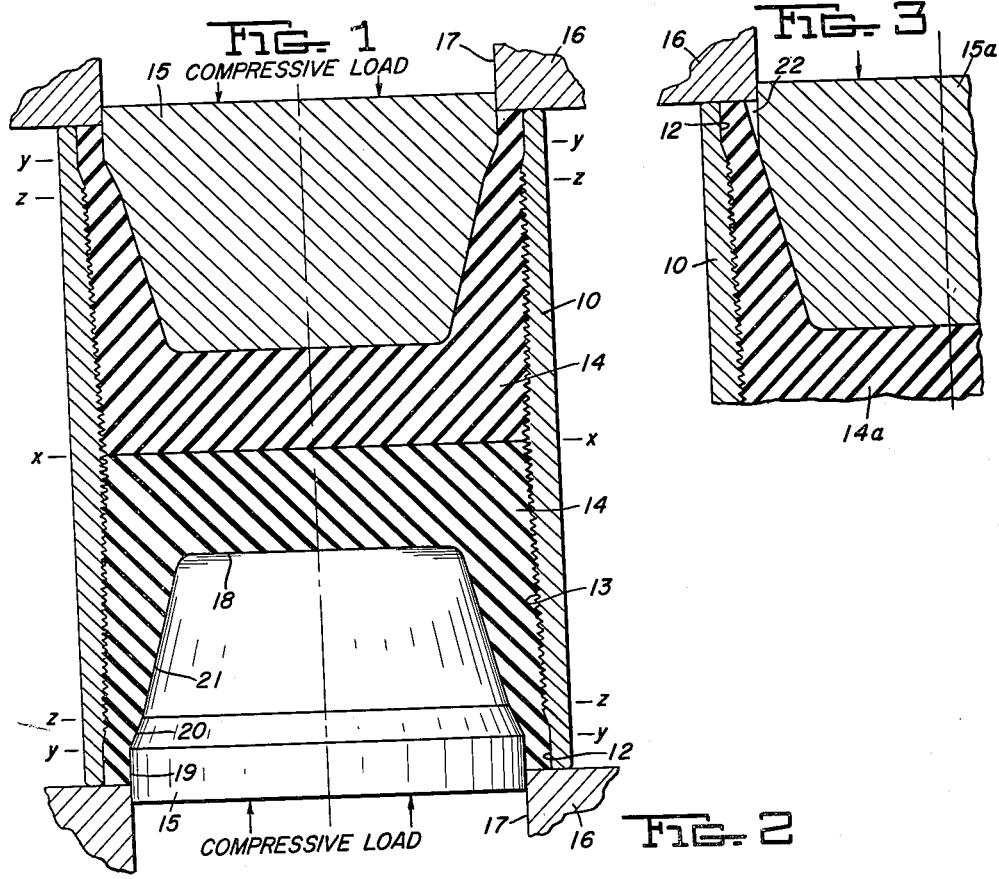
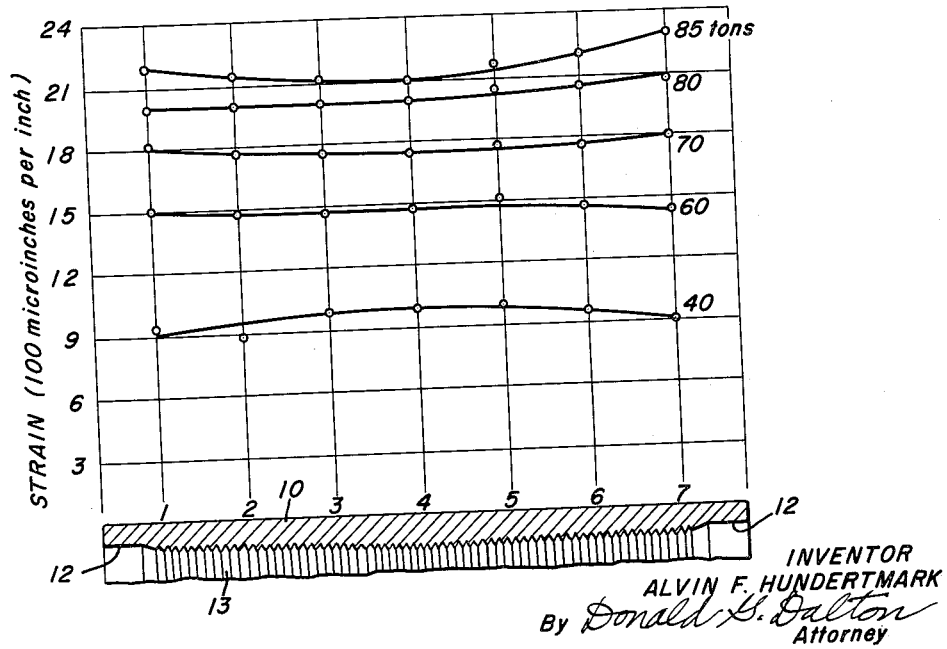
INVENTOR
ALVIN F. HUNDERTMARK
By Donald G. Dalton
Attorney

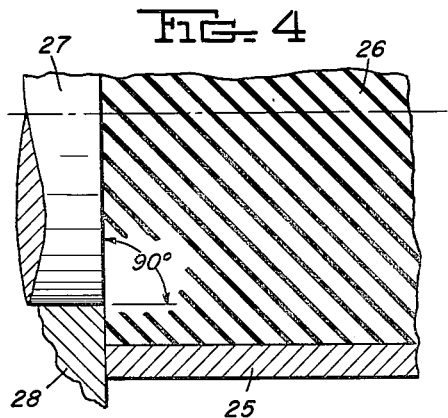
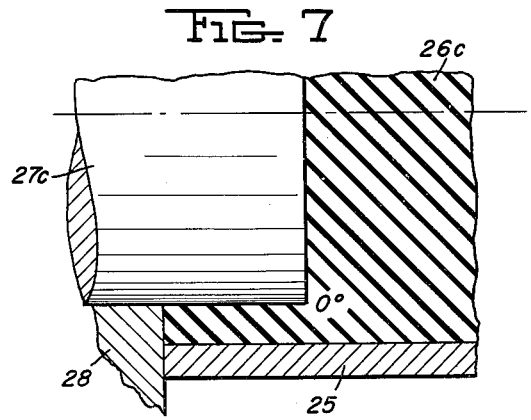
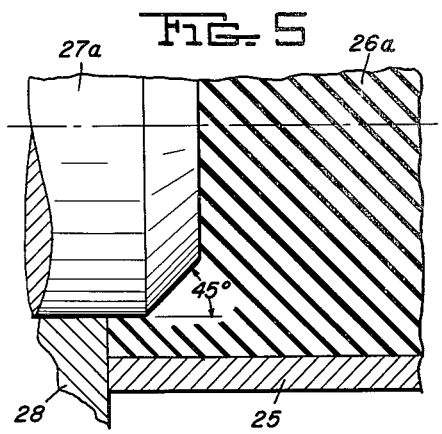
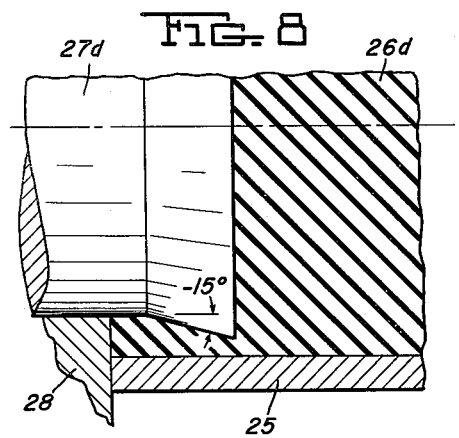
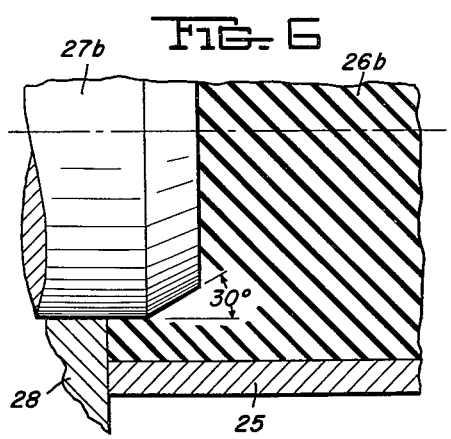
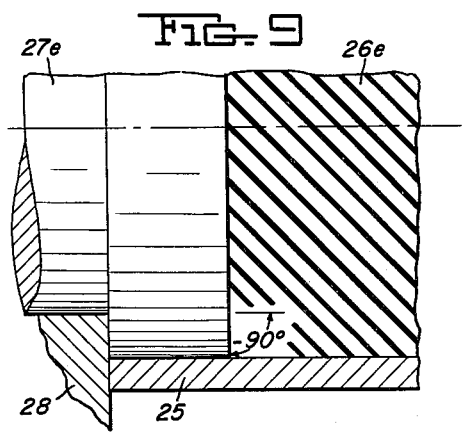

United States Patent Office 2,986,927
Patented June 6, 1961

2,986,927
APPARATUS FOR APPLYING INTERNAL PRESSURE
Alvin F. Hundertmark, Glenshaw, Pa., assignor to United States Steel Corporation, a corporation of New Jersey
Filed May 6, 1958, Ser. No. 733,423
6 Claims. (Cl. 73—88)

This invention relates to an improved method and apparatus for applying internal pressure to tubular workpieces.

The invention has general application where it is desired to achieve a predetermined strain pattern in the walls of a workpiece through internal pressure applied non-uniformly without using external dies. The invention is applicable, for example, to produce uniform strain in a workpiece whose walls are of varying thickness. This application is useful in pressure-testing short length tubular articles, such as pipe couplings or blanks therefor, which have thin-walled recesses at their ends. As another example, the invention is applicable to expand non-uniformly a workpiece whose walls are of the same thickness throughout. Therefore, while I describe the invention with particular reference to testing pipe couplings, I do not intend this description to limit the invention.

In the example of testing pipe couplings, conventional practice has been to test couplings only after they have been threaded onto a length of pipe. The ends of a pipe with one coupling attached are sealed, the bore filled with a liquid medium, and pressure applied to the medium, which of course transmits pressure uniformly throughout the pipe and coupling. The walls of the coupling are so much thinner at the end recesses that they cannot withstand the test pressure. Consequently the seal at the coupling end is applied to the outside of the coupling inwardly of the recess, whereby external pressure on the thin-walled portion balances the internal pressure. A typical test apparatus of this sort is shown in Hayes et al. Patent No. 2,655,182 of common ownership. It has been considered impractical to pressure-test a coupling by itself for the reason that internal pressure sufficient to afford a proper test of the relatively thick-walled mid-portion is greater than the thin-walled recessed end portions can withstand.

It is known to use a core of solid elastomer, such as rubber, neoprene or other equivalent synthetic, as a medium for pressure-testing a coupling or similar article alone. An elastomer core can be mounted on a metal plug and partially inserted within a coupling or other workpiece, whereupon compressive force applied to the plug is transmitted to the workpiece in much the same fashion as through a liquid medium. One example of a test apparatus of this sort is shown in Adams application Serial No. 548,637, filed November 23, 1955, (now Patent No. 2,849,878), also of common ownership. Nevertheless previous devices of this type have transmitted only uniform pressures to the workpiece, and test pressures have been limited to values which do not unduly strain the thin-walled portions. If a controlled non-uniform expansion has been desired, it has been considered necessary to surround the workpiece with external dies.

An object of the present invention is to provide an improved method and apparatus for applying internal pressure to a tubular workpiece non-uniformly to achieve a predetermined strain pattern without using external dies.

A further object is to provide an improved method and apparatus for applying internal pressure to a tubular workpiece whose walls are of varying thickness, which pressure is non-uniform but produces a substantially uniform circumferential strain in the walls.

A further object, as applied to pressure-testing of pipe couplings, is to provide an improved method and apparatus for applying internal pressure which produces substantially the same strain in the thin-walled recessed end portions as in the relatively thick-walled mid-portion, thus making it feasible to pressure-test couplings by themselves.

A more specific object is to provide an improved pressure testing apparatus which includes an elastomer core in one or more parts externally shaped to fill the bore of a workpiece, an end stop confining the core to the workpiece, and metal plugs within the respective core parts specially shaped for distributing applied forces to produce a predetermined strain pattern in the walls of the workpiece.

In accomplishing these and other objects of the invention, I have provided improved details of structure, preferred forms of which are shown in the accompanying drawings, in which:

FIGURE 1 is a longitudinal sectional view of a pipe coupling which contains a two-part core and plugs for applying internal pressure in accordance with my invention;

FIGURE 2 is a graph showing the relative strain in different portions of the pipe coupling shown in FIGURE 1 under various compressive forces applied to the plugs;

FIGURE 3 is a fragmentary longitudinal view similar to FIGURE 1, but showing a modification;

FIGURE 4 is a diagrammatic sectional view of a workpiece, end stop, core part and plug illustrating one phase of the way pressure drop varies with the angle of convergence of the plug;

FIGURE 5 is a view similar to FIGURE 4, but illustrating a second phase of the way the pressure drop varies;

FIGURE 6 is another similar view, but illustrating a third phase;

FIGURE 7 is another similar view, but illustrating a fourth phase;

FIGURE 8 is another similar view, but illustrating a fifth phase; and

FIGURE 9 is another similar view, but illustrating a sixth phase.

FIGURE 1 shows as a workpiece a conventional pipe coupling 10, which has thin walled internal recesses 12 at its ends and contains internal screw threads 13. The coupling is symmetrical with respect to a central transverse plane x—x, where its walls are of maximum thickness. The unrecessed portion of the coupling is illustrated as having the standard A.P.I. internal taper of 1°48′. A two-part solid elastomer core 14 and metal plugs 15 constructed in accordance with my invention are shown positioned within the coupling. The two core parts are of similar construction, and each is externally shaped to fill half the bore of the test piece except for the thread roots. The two plugs likewise are of similar construction and are specially shaped, as hereinafter explained, to achieve a predetermined strain pattern, which in this instance is uniform circumferentially throughout the length of the coupling. A pair of end stops 16 have planar faces which abut the end faces of the workpiece 10 and core 14 and thus wholly confine the core within the bore of the workpiece. The end stops hold the workpiece and core with sufficient firmness that pressure applied to the core does not push them back, but they do not exert any significant compressive load on the workpiece. The end stops contain apertures 17 which closely receive the outer portions of plugs 15. A compressive load can be applied to the plugs by any suitable means, not shown, and forces the core into the thread roots and then strains the walls. To apply non-uniform pressure, it is critical not to transmit direct loads from the plugs to the end faces of the annular portions of the core.

Each part of core 14 contains a socket 18 which extends about one-half to three-fourths the depth of the core part. Each of the plugs 15 illustrated is constructed to produce uniform circumferential strain in a pipe coupling and has a cylindrical portion 19 and first and second tapered core-engaging faces 20 and 21. The socket 18 is contoured to correspond and the plug fits closely therein. The cylindrical portion 19 of the plug extends from a plane outside the coupling to a parallel plane $y$—$y$ which intersects the coupling walls near the bottom of its recess 12. The first tapered face 20 extends from plane $y$—$y$ to plane $z$—$z$ which intersects the coupling walls near the beginning of threads 13. The angle of taper of this face is about 22° to 28°, preferably about 25°, with respect to the central axis of the plug. The second tapered face 21 extends from plane $z$—$z$ to the end of the plug. The angle of taper of this face is about 12° to 18°, preferably about 15° with respect to the central axis.

FIGURE 2 shows a graph of the strain pattern attained with this embodiment of the invention superposed on a longitudinal section of the coupling wall. Points on the curves of FIGURE 2 were determined by mounting conventional strain gages on the outside of the coupling 10 to measure circumferential strain at positions 1 to 7 indicated in the figure. A two part elastomer core 14, plugs 15 and end stops 16 were installed as shown in FIGURE 1. Compressive loads of 40, 60, 70, 80 and 85 tons were applied successively to the plugs. The resulting circumferential strain in the coupling wall was substantially uniform for each load, as FIGURE 2 shows.

FIGURE 3 shows a modification which is useful where it is desired to reduce the strain in a localized region of a workpiece. Again the workpiece is illustrated as a pipe coupling 10 which has recesses 12 at its ends. To reduce further the strain in the walls at the recesses, a void space 22 is left between the inside of the core 14a and the outside of the plug 15a. Thus the pressure transmitted from the plug to the core at this void is significantly reduced over the pressure where there is direct contact.

FIGURES 4 to 9 illustrate more completely the principles involved in the present invention. Each of these figures shows a tubular workpiece 25 of uniform wall thickness, a solid elastomer core 26, 26a, 26b, 26c, 26d or 26e within the workpiece, a plug 27, 27a, 27b, 27c, 27d or 27e engaging the core, and an end stop 28 abutting the end of the workpiece and confining the core wholly to the bore. FIGURE 4 shows a plug 27 which abuts the end of core 26 in the same plane as the end face of the workpiece 25, and represents a 90° angle of convergence between the direction of applied force and the core-engaging face of the plug. FIGURE 5 shows a plug 27a whose core-engaging face tapers at an angle of 45° within core 26a and thus represents a 45° angle of convergence. FIGURE 6 shows a plug 27b whose core-engaging face tapers at an angle of 30° within core 26b and thus represents a 30° angle of convergence. FIGURE 7 shows a plug 27c whose sides are straight within core 26c and thus represents a 0° angle of convergence. FIGURE 8 shows a plug 27d whose core-engaging face flares outwardly 15° within core 26d and thus represents a minus 15° angle of convergence. FIGURE 9 shows a plug 27e which abuts the end of core 26e within the bore of the workpiece and thus represents a minus 90° angle of convergence.

The arrangement shown in FIGURE 4 can apply only uniform pressure to the walls of the workpiece and is the equivalent of applying pressure through a liquid medium. The arrangements shown in FIGURES 5 to 8 apply a progressively smaller pressure to the end portions of the workpiece with respect to the pressure applied beyond the plug. The arrangement shown in FIGURE 9 applies no pressure whatever to the end portion of the workpiece and thus represents the extreme condition. Thus it is seen that when the end stop wholly confines an elastomer core within the bore of the workpiece, the pressure drop on the end portion is an inverse function of the angle of convergence of the core-engaging faces. The arrangement shown in FIGURE 1 represents one novel practical application of this principle, but the same principle can be txtended to achieve predetermined strain patterns of numerous other types.

While I have shown and described certain preferred embodiments of my invention, it is apparent that other modifications may arise. Therefore, I do not wish to be limited to the disclosure set forth but only by the scope of the appended claims.

I claim:

1. An apparatus for applying internal pressure to a tubular workpiece comprising a solid elastomer core adapted to fill the bore of the workpiece and having an annular outer end face, an end stop adapted to engage said end face and confine said core wholly within the bore, a rigid plug extending through said stop and at least partially lying within said core and being of smaller diameter than said core, whereby the plug transmits no direct load to said end face, and means for applying a compressive load to said plug, said plug having core-engaging faces which enable said core to transmit pressure resulting from the load non-uniformly to the walls of the workpiece to achieve a predetermined strain pattern.

2. An apparatus for applying internal pressure to a tubular workpiece whose walls are of varying thickness comprising a solid elastomer core adapted to fill the bore of the workpiece and having an annular outer end face, an end stop adapted to engage said end face and confine said core wholly within the bore, a rigid plug extending through said stop and at least partially lying within said core and being of smaller diameter than said core, whereby the plug transmits no direct load to said end face, and means for applying a compressive load to said plug, said plug having core-engaging faces which enable said core to transmit pressure resulting from the load non-uniformly to the walls of the workpiece to achieve substantially uniform strain in these walls despite variations in thickness.

3. A pressure-testing apparatus comprising a solid elastomer core adapted to fill the bore of a tubular workpiece and having an annular outer end face, an end stop having a planar surface engageable with the outer faces of the core and workpiece to confine the core wholly within the bore, a rigid plug extending through said stop and at least partially lying within said core, and means for applying a compressive load to said plug, said plug being of smaller diameter than said core, whereby the plug transmits no direct load to said end face, said plug having tapered core-engaging faces which enable said core to transmit pressure resulting from the load non-uniformly to the walls of the workpiece to achieve substantially uniform strain in these walls despite variations in their thickness.

4. An apparatus for pressure-testing pipe couplings which have thin-walled recesses at their ends comprising a two-part solid elastomer core adapted to fill the bore of the coupling and having annular outer end faces, a pair of end stops having planar surfaces engageable with the respective end faces of the core and coupling to confine the core wholly within the bore, rigid plugs extending through the respective stops and at least partially lying within the respective core parts, and means for applying a compressive load to said plugs, said plugs being of smaller diameter than said core parts, whereby the plugs transmit no direct load to the end faces of the core parts, said plugs having tapered core engaging faces which enable said core to transmit pressure resulting from the load non-uniformly to the coupling walls to achieve substantially uniform strain in the walls at the recesses as in the walls at the remainder of the coupling.

5. An apparatus as defined in claim 4 in which each plug extends approximately one half to three fourths of the depth of the core part and the core-engaging faces have a double taper.

6. An apparatus as defined in claim 4 in which each plug extends approximately one half to three fourths of the depth of the core part and has a cylindrical portion extending from its outer end to a plane adapted to intersect the coupling near the bottom of the recess, a core-engaging face tapering at an angle of about 22° to 28° with respect to its central axis extending from said cylindrical portion, and a core engaging face tapering at an angle of about 12° to 18° with respect to its central axis extending from said first named core engaging face.

References Cited in the file of this patent

UNITED STATES PATENTS 2,849,878    Adams _____ Sept. 2, 1958